United States Patent
Tsahhirov et al.

(10) Patent No.: US 12,477,026 B2
(45) Date of Patent: Nov. 18, 2025

(54) MEDIA SERVER PROXY THAT SWITCHES STREAMING MEDIA PROTOCOLS

(71) Applicant: Microsoft Technology Licensing, LLC, Redmond, WA (US)

(72) Inventors: Ilja Tsahhirov, Bellevue, WA (US); Mihhail Konovalov, Kirkland, WA (US); Rajesh Gunnalan, Sammamish, WA (US); Tin Qian, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 20 days.

(21) Appl. No.: 18/385,329

(22) Filed: Oct. 30, 2023

(65) Prior Publication Data

US 2025/0141947 A1    May 1, 2025

(51) Int. Cl.
*H04L 65/61* (2022.01)
*H04L 65/613* (2022.01)
(Continued)

(52) U.S. Cl.
CPC ............ *H04L 65/61* (2022.05); *H04L 65/613* (2022.05); *H04L 65/65* (2022.05); *H04L 65/765* (2022.05); *H04L 65/80* (2013.01); *H04L 69/08* (2013.01)

(58) Field of Classification Search
CPC ....... H04L 65/61; H04L 65/613; H04L 65/65; H04L 65/765; H04L 65/80; H04L 69/08;
(Continued)

(56) References Cited

U.S. PATENT DOCUMENTS

| | | | | |
|---|---|---|---|---|
| 7,711,791 | B2 * | 5/2010 | DuVall | H04L 67/02 709/219 |
| 8,805,963 | B2 * | 8/2014 | Pantos | H04L 65/1083 709/219 |

(Continued)

FOREIGN PATENT DOCUMENTS

| | | | | |
|---|---|---|---|---|
| EP | 3767965 | A1 * | 1/2021 | ........... H04L 65/608 |
| EP | 4336799 | A1 * | 3/2024 | ........... H04L 65/611 |

(Continued)

OTHER PUBLICATIONS

ISO/IEC, "Information Technology—Dynamic Adaptive Streaming over HTTP (DASH)—Part 1: Media Presentation Description and Segment Formats," ISO/IEC 23009-1, 152 pp. (May 2014).

(Continued)

*Primary Examiner* — Alina A Boutah
(74) *Attorney, Agent, or Firm* — Klarquist Sparkman, LLP

(57) ABSTRACT

A media server proxy switches streaming media protocols ("SMPs") during streaming of media segments. The media server proxy receives a request, from a playback tool, according to a first SMP to provide information about outgoing media segments of a media sequence. The media server proxy generates the information about outgoing media segments and sends the information to the playback tool. The media server proxy also retrieves, from a remote server, incoming media content for the media sequence according to a second SMP different than the first SMP. The media server proxy assembles outgoing media segments based at least in part on the incoming media content. The media server proxy streams, to the playback tool, outgoing media segments according to the first SMP. In this way, the media server proxy can deliver media segments at very low (Continued)

latency, even when the first SMP typically has much higher latency.

20 Claims, 9 Drawing Sheets

(51) Int. Cl.
*H04L 65/65* (2022.01)
*H04L 65/75* (2022.01)
*H04L 65/80* (2022.01)
*H04L 69/08* (2022.01)
*H04N 21/222* (2011.01)

(58) Field of Classification Search
CPC ............. H04N 21/222; H04N 21/2353; H04N 21/438; H04N 21/845
See application file for complete search history.

(56) References Cited

U.S. PATENT DOCUMENTS

| | | | | |
|---|---|---|---|---|
| 9,344,472 | B2* | 5/2016 | Cheng | H04N 21/8456 |
| 11,202,122 | B1* | 12/2021 | Sehgal | H04N 21/44004 |
| 11,206,295 | B1* | 12/2021 | Karagkioules | H04L 65/611 |
| 11,405,444 | B1* | 8/2022 | Liu | H04L 65/612 |
| 11,736,552 | B1* | 8/2023 | Gunnalan | H04N 21/23805 |
| | | | | 709/231 |
| 12,058,355 | B2* | 8/2024 | Luthra | H04N 19/40 |
| 2013/0007223 | A1* | 1/2013 | Luby | H04N 21/234327 |
| | | | | 709/219 |
| 2013/0275557 | A1 | 10/2013 | Myers et al. | |
| 2014/0019635 | A1* | 1/2014 | Reznik | H04L 63/0428 |
| | | | | 709/231 |
| 2014/0136653 | A1* | 5/2014 | Luby | H04L 65/65 |
| | | | | 709/217 |
| 2014/0281009 | A1 | 9/2014 | Moorthy et al. | |
| 2014/0297882 | A1* | 10/2014 | Estrop | H04N 21/43072 |
| | | | | 709/231 |
| 2015/0365450 | A1* | 12/2015 | Gaunt | H04L 65/65 |
| | | | | 709/231 |
| 2016/0212054 | A1* | 7/2016 | Howard | H04L 65/80 |
| 2016/0308931 | A1* | 10/2016 | Wu | H04N 21/44016 |
| 2018/0131742 | A1* | 5/2018 | DiMattia | H04L 67/02 |
| 2018/0199075 | A1* | 7/2018 | Wang | H04L 65/65 |
| 2020/0099972 | A1* | 3/2020 | Gerosa | H04L 65/80 |
| 2020/0186849 | A1* | 6/2020 | Stratton | H04N 21/234327 |
| 2020/0267437 | A1* | 8/2020 | Pantos | H04N 21/4621 |
| 2021/0105542 | A1* | 4/2021 | Stockhammer | H04N 7/54 |
| 2021/0235170 | A1 | 7/2021 | Valliere | |
| 2021/0377330 | A1* | 12/2021 | Trayanov | H04N 21/8456 |
| 2023/0107615 | A1* | 4/2023 | Zhang | H04L 65/65 |
| | | | | 725/38 |
| 2024/0073268 | A1* | 2/2024 | Chen | H04L 65/612 |
| 2024/0414219 | A1* | 12/2024 | Kadaroesman | H04L 65/80 |

FOREIGN PATENT DOCUMENTS

| | | | | | |
|---|---|---|---|---|---|
| GB | | 2588930 | A * | 5/2021 | ......... H04L 65/4084 |
| JP | | 2022551436 | A * | 12/2022 | ............ G06F 16/60 |
| WO | WO-2017035376 | A2 * | 3/2017 | ............ G06F 16/60 |
| WO | WO-2020167785 | A1 * | 8/2020 | ........... H04L 65/612 |
| WO | WO-2023027346 | A1 * | 3/2023 | ......... H04L 43/0894 |

OTHER PUBLICATIONS

Mozilla, "Using Service Workers," downloaded from https://developer.mozilla.org/en-US/docs/Web/API/Service_Worker_API/Using_Service_Workers, 19 pp. (Jul. 2023).
Mozilla, "Service Worker API," downloaded from https://developer.mozilla.org/en-US/docs/Web/API/Service_Worker_API, 8 pp. (Apr. 2023).
Pantos et al., "HTTP Live Streaming," RFC 8216, 60 pp. (Aug. 2017).
Wikipedia, "Dynamic Adaptive Streaming over HTTP," downloaded from https://en.wikipedia.org/wiki/Dynamic_Adaptive_Streaming_over_HTTP, 8 pp. (Sep. 2023).
Wikipedia, "HTTP Live Streaming," downloaded from https://en.wikipedia.org/wiki/HTTP_Live_Streaming, 14 pp. (Nov. 2023).
Belda et al., "A DASH Server-Side Delay-Based Representation Switching Solution to Improve the Quality of Experience for Low-Latency Live Video Streaming," Computer Networks, vol. 235, 15 pp. (Aug. 2023).
International Search Report and Written Opinion dated Jan. 22, 2025, for International Patent Application No. PCT/US2024/049354, 13 pp.

\* cited by examiner

400

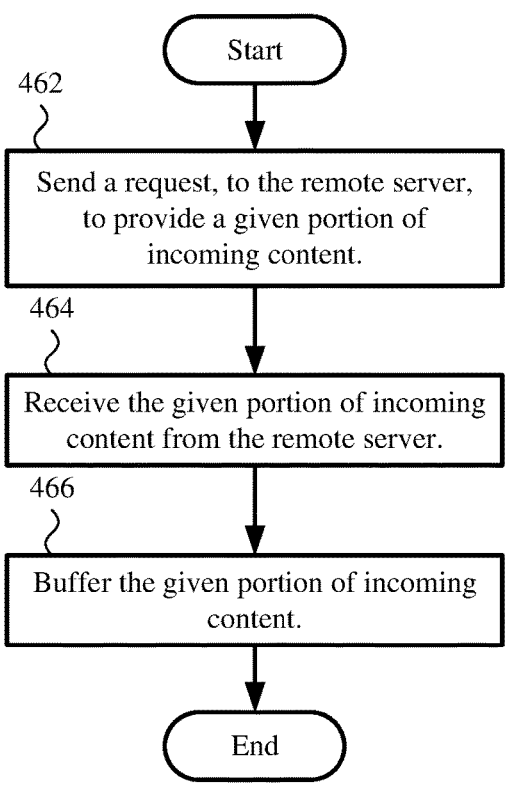
FIG. 4b    401 (example of 460)
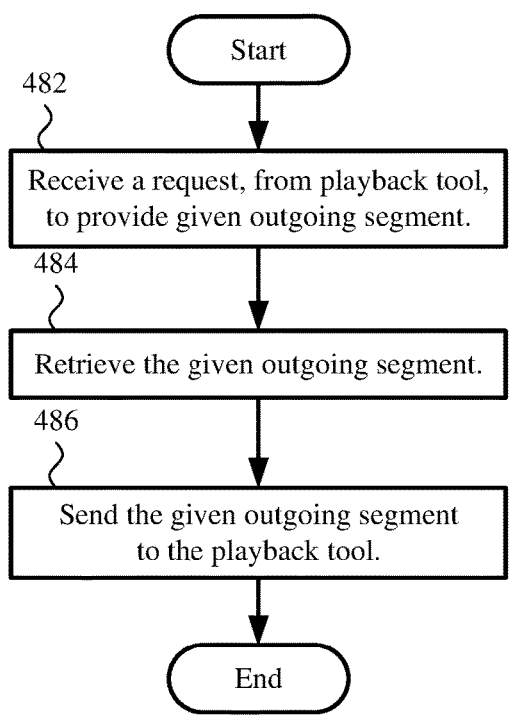
FIG. 4c    402 (example of 480)

software 580 implementing one or more innovations for a media streaming proxy with switching of media streaming protocols

MEDIA SERVER PROXY THAT SWITCHES STREAMING MEDIA PROTOCOLS

BACKGROUND

A streaming media protocol ("SMP") defines a way to deliver media content such as video content and audio content over a network. A playback tool requests media content from a media server, which streams the media content over the network. The playback tool can be, for example, a Web application that plays media content in an html/video element of a Web page, and the media server can be a Web server that streams the requested media content over the Internet to the Web application.

Two common SMPs are HTTP Live Streaming ("HLS") and Dynamic Adaptive Streaming over HTTP ("DASH"). In general, a playback tool that supports HLS or DASH retrieves a playlist (sometimes called a manifest) that lists media segments of a media sequence. A media segment of a media sequence is a portion representing media over a period of time. The playback tool can request media segments, identified in the playlist, from a media server using URLs that identify files for the respective media segments. When the playback tool requests a media segment from the media server, the media server streams the requested media segment to the playback tool. The playback tool receives, decodes, and plays back the requested media segments.

According to the HLS protocol or DASH protocol, a media server that streams media segments can provide alternate versions of the media segments at different bit rates, which are associated with different quality levels. When requesting encoded data for media segments for playback, a playback tool can adaptively switch between bit rates from segment-to-segment by changing which versions of the media segments are requested, depending on available network bandwidth or device capabilities for the playback tool.

Streaming according to the HLS protocol or DASH protocol works well in many usage scenarios (such as on-demand streaming over a reliable network) but can suffer from performance problems in other scenarios. For example, streaming according to the HLS protocol or DASH protocol often suffers from poor performance in scenarios that seek to provide playback with very low latency (e.g., sub-second latency). In particular, playback latency when using HLS or DASH may be too long in implementations in which a Web application manages playback buffer size depending on network conditions, or a Web application retrieves a playlist too frequently, or media segments are too long. A variation of HLS called Low-Latency HLS ("LL-HLS") enables lower latency in some situations. Best-case latency using LL-HLS can still be too long due to features of the protocol itself, however, and in practice even that amount of best-case latency might not be achievable on real networks. As another example, in a lossy network, rate control according to HLS or DASH may fail due to ineffective client-side decision-making processes. Also, operations for the transport protocol used for HLS or DASH may aggressively "back off" from timely delivery of network packets, causing playback to be delayed or stalled in order to avoid packet losses. As another example, client-side operations to compose media segments from multiple sequences for playback in a single media sequence are not easily accomplished for media delivered using HLS or DASH.

SUMMARY

In summary, the detailed description presents innovations in operations of a media server proxy that switches streaming media protocols ("SMPs"). The innovations can enable a media server proxy, situated between a remote server and playback tool, to provide various functionality. For example, the innovations can enable a media server proxy to deliver media segments from the remote server to the playback tool at very low latency (e.g., sub-second latency), even when the playback tool uses a conventional SMP that typically has much higher latency. As another example, the innovations can enable a remote server and media server proxy to adapt the bit rate of media segments delivered over a lossy network, even when a playback tool uses a conventional SMP that supports only client-side rate control processes. As another example, the innovations can enable a media server proxy to compose media segments from multiple sequences for playback in a single media sequence, which can then be streamed to a playback tool using a conventional SMP. The innovations include the features covered by the claims.

According to a first aspect of the techniques and tools described herein, a media server proxy is situated between a remote server and a playback tool. The media server proxy receives a request, from the playback tool, according to a first SMP to provide information about outgoing media segments of a media sequence. The media server proxy generates the information about the outgoing media segments and sends, to the playback tool, the information about the outgoing media segments. The media server proxy also retrieves, from the remote server, incoming media content for the media sequence according to a second SMP different than the first SMP. For example, the media server proxy sends a request, to the remote server, to provide a given portion of incoming media content. The media server proxy receives the given portion of incoming media content from the remote server and buffers the given portion of incoming media content. (As used herein, the terms "incoming" and "outgoing" indicate direction from the perspective of the media server proxy. Incoming media content is received by the media server proxy. Outgoing media segments are sent from the media server proxy.)

The playback tool supports the first SMP but need not directly support the second SMP. In some example implementations, the first SMP is HLS, and the second SMP is a low-latency SMP with lightweight congestion control or flow control. More generally, compared to the second SMP, the first SMP can differ in various respects. For example, the first SMP can have higher expected minimum latency due to longer buffering by the playback tool before playback begins or a longer time window for receipt of network packets. Or, the first SMP can have ineffective rate control in a lossy network between the remote server and the playback tool, due to limitations of client-side rate control, more aggressive congestion control, and/or more aggressive flow control. Or, the first SMP can have features that hinder client-side composition of media sequences. Nevertheless, by supporting the second SMP, the media server proxy can effectively overcome the deficiencies of the first SMP.

The media server proxy assembles the outgoing media segments based at least in part on the incoming media content retrieved from the remote server, which can involve repackaging the incoming media content and/or transcoding the incoming media content. The media server proxy stores the outgoing media segments in an outgoing media buffer. The media server proxy then streams, to the playback tool, outgoing media segments according to the first SMP. For example, the media server proxy receives a request, from the playback tool, to provide a given outgoing media segment. The media server proxy retrieves the given outgoing media segment from the outgoing media buffer and sends the given outgoing media segment to the playback tool.

In some example implementations, the media server proxy and the playback tool are hosted on the same client device. In other example implementations, the media server proxy is hosted on a gateway server, and the playback tool is hosted on a client device connected over a local network to the gateway server. In general, to the playback tool, the media server proxy appears to be the remote server streaming media segments according to the first SMP. On the other hand, to the remote server, the media server proxy appears to be a local client retrieving media content according to the second SMP.

According to a second aspect of the techniques and tools described herein, a media server proxy, situated between a remote server and a playback tool, includes a request handler, a playlist generator, a server communication module, and a segment assembler. The request handler is configured to perform various request handling operations. For example, the request handling operations include receiving a request, from a playback tool, according to a first SMP to provide information about outgoing media segments of a media sequence, sending, to the playback tool, the information about the outgoing media segments, and streaming, to the playback tool, outgoing media segments according to the first SMP. The playlist generator is configured to generate the information about the outgoing media segments. The server communication module is configured to perform various retrieval operations. For example, the retrieval operations include retrieving, from a remote server, incoming media content for the media sequence according to a second SMP different than the first SMP. The segment assembler is configured to perform various assembly operations. For example, the assembly operations include assembling the outgoing media segments based at least in part on the incoming media content. The assembly operations can also include operations to repackage media segments, operations to transcode between container formats, operations to transcode between codec formats, and/or operations to transcode between bit rates/quality levels.

According to a third aspect of the techniques and tools described herein, a computer system receives software for a media server proxy. With the software, the computer system is configured to perform operations as the media server proxy. For example, the operations are the operations described above with reference to the first aspect or second aspect.

The innovations described herein can be implemented as part of a method, as part of a computer system (physical or virtual, as described below) configured to perform the method, or as part of a tangible computer-readable media storing computer-executable instructions for causing one or more processors, when programmed thereby, to perform the method. The various innovations can be used in combination or separately. The innovations described herein include the innovations covered by the claims. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures and illustrates a number of examples. Examples may also be capable of other and different applications, and some details may be modified in various respects all without departing from the spirit and scope of the disclosed innovations.

BRIEF DESCRIPTION OF THE DRAWINGS

FIGS. 4b and 4c are flowcharts illustrating example retrieval operations and streaming operations, respectively, according to the example technique shown in FIG. 4a.

DETAILED DESCRIPTION

Figure 1A:
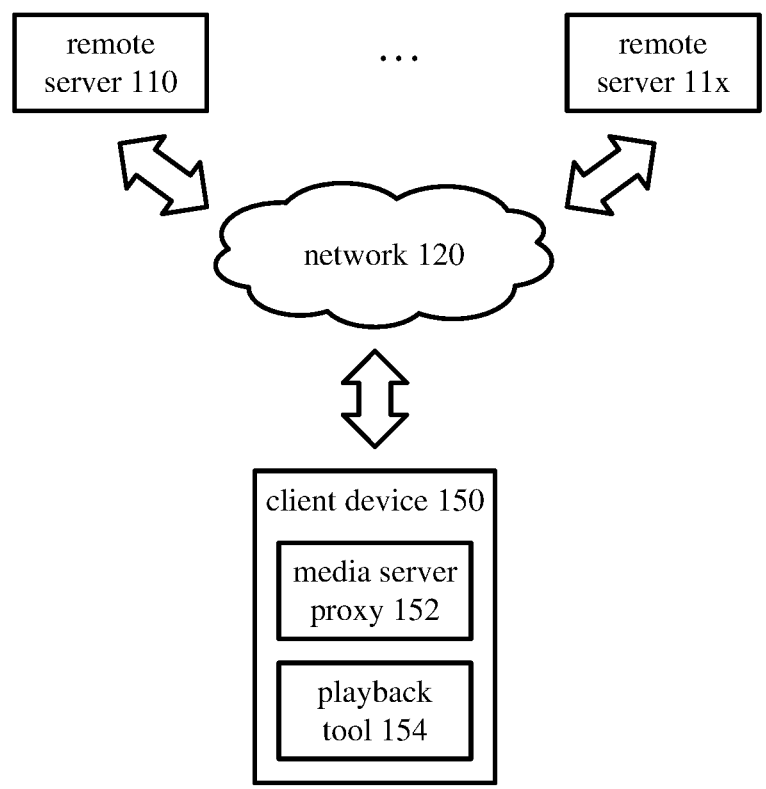
FIGS. 1a and 1b are diagrams illustrating example media streaming environments in which some described embodiments can be implemented.

The detailed description presents innovations in operations of a media server proxy that switches streaming media protocols ("SMPs"). The media server proxy is situated between a remote server and playback tool. The innovations can enable the media server proxy to provide various functionality, even when the playback tool only supports a conventional SMP such as HLS or DASH. For example, the innovations can enable the media server proxy to deliver media segments from the remote server to the playback tool at very low latency (e.g., sub-second latency), even when the conventional SMP used by the playback tool typically has much higher latency. As another example, the innovations can enable the remote server and media server proxy to adapt the bit rate of media segments delivered over a lossy network, even when the conventional SMP used by the playback tool supports only client-side rate control processes. As another example, the innovations can enable the media server proxy to compose media segments from multiple sequences for playback in a single media sequence, which can then be streamed to the playback tool using the conventional SMP.

When streaming media segments from a remote server over the Internet, some playback tools support only a conventional SMP such as HLS or DASH. Such a conventional SMP may be unsuitable for a particular usage scenario. For example, buffering settings or congestion control operations according to the conventional SMP may prevent a playback tool from achieving ultra-low latency in delivery of encoded data, even if a network would otherwise allow ultra-low-latency delivery. As another example, flow control operations according to the conventional SMP may interfere with timely delivery of encoded data over a lossy network.

To address these deficiencies, a media server proxy can manage delivery of media segments between a remote server and a playback tool. For interactions with the playback tool, the media server proxy uses a conventional SMP such as HLS. On the other hand, for interactions with the remote server, the media server proxy uses a different SMP that does not have the deficiencies of the conventional SMP. During streaming of media segments, the media server proxy can perform operations to manage the transition or conversion between the two SMPs.

When the playback tool requests media segments of a media sequence from the remote server, the media server proxy intercepts the request. For example, the media segments of the media sequence are advertised as "published" to a pre-defined uniform resource locator ("URL"), pseudo-URL, or other address. In some example implementations, a service worker implements the media server proxy and manages delivery of media segments that are in scope for the service worker. More generally, the media server proxy can intercept a URL that references a particular server registered with the media server proxy.

In response to receiving (from the playback tool) a request for media segments from the remote server, the media server proxy dynamically produces information about the media segments. The information about the media segments can be organized as a playlist (also called a manifest) according to the conventional SMP. In some example implementations, the media server proxy generates information about a long sequence of very short media segments (e.g., 300 milliseconds per segment). The media server proxy can generate such information without retrieving media segments from the remote server. In particular, the media server proxy can generate information about media segments according to a static pattern or convention for media segments to be retrieved from the remote server. For example, the media server lists files such as 001.mp4, 002.mp4, 003.mp4, etc. in a playlist. In any case, the media server proxy sends the information about the media segments to the playback tool that sent the request. From time to time, the media server proxy can update the information about the media segments and resend the information to the playback tool.

The media server proxy retrieves media segments from the remote server according to the different SMP, which does not have the deficiencies of the conventional SMP. For example, the different SMP is a low-latency transport protocol with lightweight flow control. More generally, when retrieving media segments from the remote server, the media server proxy and remote server can use a customized or proprietary SMP. In some example implementations, the media server proxy retrieves encoded data for media segments using a long-term HTTP connection that delivers packets as single-direction byte flows, for which latency is on the order of tens of milliseconds.

A media segment is a portion representing media over a period of time. For video, a media segment can be a group of pictures ("GOP") or multiple GOPs. Encoded data for a media segment is stored in a media container. A media container can store encoded data for video content, audio content, closed captioning content, augmented reality content, virtual reality content, and/or other media content. In some example implementations, a portion of incoming media content retrieved by the media server proxy from the remote server is simply used as an outgoing media segment to be streamed by the media server proxy to the playback tool. Alternatively, the media server proxy can perform operations to repackage incoming media content into outgoing media segments (e.g., repackaging multiple portions of incoming media content as a single outgoing media segment, or repackaging a single portion of incoming media content as multiple outgoing media segments). In some example implementations, the media server proxy does not change media container formats, media codec formats, or bit rates between the incoming media content and outgoing media segments. Alternatively, the media server proxy can perform transcoding operations to switch container formats and/or media codec formats or bit rates/quality levels.

As used herein, the terms "incoming" and "outgoing" indicate direction from the perspective of the media server proxy. Incoming media content is received by the media server proxy. Outgoing media segments, which are based on the incoming media content, are sent from the media server proxy.

Responsive to requests from the playback tool to provide media segments, the media server proxy streams the requested media segments to the playback tool according to the conventional SMP. The media server proxy and playback tool can be hosted on the same client device, in which case delivery of the media segments from the media server proxy to the playback tool has extremely low latency. Alternatively, the media server proxy can be hosted on a gateway server separated by a very fast network from the client device that hosts the playback tool, in which case delivery of the media segments from the media server proxy to the playback tool still has very low latency. Where applicable, features of the conventional SMP for buffering to prevent stalls during playback, for congestion control, for flow control, or for rate control can be disabled since they are not needed to manage delivery of the media segments from the media server proxy to the playback tool.

A media segment listed in a playlist is not available for streaming to a playback tool until the media server proxy has retrieved encoded data for the media segment from the remote server. Unaware that the media segment is not yet available, the playback tool may request that the media server proxy provide the media segment. In this case, the media server proxy delays completion of the request until the media segment is available. The playback tool considers this situation as a regular networking issue and waits for the requested segment. The playback tool starts playback when the media segment has been received by the playback tool. Meanwhile, the media server proxy retrieves the next media segment and caches the next media segment. When the playback tool requests the next media segment from the media server proxy, the media server proxy can immediately provide it. In this way, playback is stabilized such that playback of a current media segment overlaps retrieval of the next media segment. Overall, the achievable latency can be as low as a few hundred milliseconds in some example implementations.

The media server proxy and/or remote server can adapt bit rate of the media segments that are retrieved by the media server proxy from the remote server and streamed by the media server proxy to the playback tool. In many cases, compared to the playback tool, the remote server or media server proxy is well-positioned to determine available bandwidth and adjust the bit rate of media segments. In this case, the media server proxy updates the information about media segments and sends the updated information to the playback tool. The playback tool can then request media segments listed in the updated information.

In some usage scenarios, a media server proxy distributes media segments from a remote server to a playback tool or multiple playback tools as part of a real-time presentation. For example, media server proxies manage delivery of media segments from one source to n participants, where n is typically a large number such as 100, 500, 1000, or more participants. In the real-time presentation, most traffic flows from one source (at the remote server) to the playback tool(s), and very low latency is a primary consideration. Taking advantage of a fast network connection between the remote server and a media server proxy, very low latency can be achieved, even when the playback tools support only a conventional SMP (such as HLS) that does not permit very low latency. Alternatively, a media server proxy can be used in other usage scenarios such as peer-to-peer communication or delivery of media segments over a lossy network.

In some examples, a media server proxy works with a single remote server to retrieve segments of a media sequence. Alternatively, a media server proxy can work with multiple remote servers to retrieve segments of a given media sequence (with different servers providing different versions of the same content) or to retrieve media segments of multiple media sequences.

In some examples, a media server proxy retrieves segments of a single media sequence. Alternatively, a media server proxy retrieves segments of multiple media sequences and composes the media segments into a single composite sequence.

I. Example Streaming Media Protocols

In general, for interactions with a playback tool, a media server proxy uses a first streaming media protocol ("SMP"). On the other hand, for interactions with a remote server, the media server proxy uses a second SMP, which is different than the first SMP. The first SMP can have different capabilities than the second SMP in one or more respects. For example, compared to the second SMP, the first SMP has higher expected minimum latency due to longer buffering by the playback tool before playback begins or a longer time window for receipt of network packets. Or, as another example, compared to the second SMP, the first SMP has ineffective rate control in a lossy network between the remote server and the playback tool, due to limitations of client-side rate control, more aggressive congestion control, and/or more aggressive flow control. Or, as another example, compared to the second SMP, the first SMP has features that hinder client-side composition of media sequences.

In some example implementations, the first SMP is HTTP Live Streaming ("HLS"). In many cases, a playback tool supports HLS but not any other SMP. HLS uses a playlist that includes information about media segments that can be requested. HLS uses Hypertext Transfer Protocol ("HTTP") as an application-layer protocol, uses Transmission Control Protocol ("TCP") as a transport-layer protocol, and uses Internet Protocol ("IP") as a network-layer protocol. Encoded data for media segments is delivered between the media server proxy and playback tool using TCP/IP, with the media server proxy acting as an HTTP server, and the playback tool acting as an HTTP client. To the extent possible, the playback tool can disable latency compensation mechanisms of HLS when interacting with the media server proxy. For example, the playback tool can operate in a video-on-demand mode, relying on the media server proxy to manage overall latency.

Alternatively, the first SMP is a different SMP (such as Dynamic Adaptive Streaming over HTTP ("DASH") or Microsoft Smooth Streaming ("MSS")).

In some example implementations, the second SMP is a low-latency proprietary SMP. The second SMP uses a transport protocol with lightweight flow control along with IP for delivery of packets over a network. The transport protocol is potentially "lossy" in that the transport protocol tends to designate packets as "lost" quickly, without retransmission of packets, rather than aggressively throttle rate or increase packet delivery windows. The second SMP does not use a playlist that lists information about media segments, for selection by the media server proxy. Moreover, the second SMP does not use media segments in the same way as the first SMP. A portion of incoming media content according to the second SMP can simply be a media file for a container of encoded data. The portion of incoming media content might or might not be coextensive with an outgoing media segment according to the first SMP.

In some configurations, the second SMP uses a dedicated network connection between a remote server and media server proxy. Media segments from the remote server "fan out" to two layers of network servers, which deliver the media segments to client devices in a predictable way as single-direction byte flows. Different playback tools can share a buffer at an intermediate server to reduce bandwidth utilization.

Alternatively, the second SMP is a different SMP (such as Secure Reliable Transport ("SRT") or Faster-Than-Light ("FTL")).

II. Example Network Environments

FIG. 1a shows an example media streaming environment (101) in which some described embodiments can be implemented. The example media streaming environment (101) includes one or more remote servers (110 . . . 11x), a network (120), and a client device (150). The client device (150) includes a media server proxy (152) and playback tool (154). The media server proxy (152) interacts with the playback tool (154) using a first SMP, and the media server proxy (152) interacts with a remote server (110 . . . 11x) according to a second SMP.

A remote server (110 . . . 11x) stores and streams encoded data for media segments of media sequences. In general, the remote server (110 . . . 11x) provides encoded data for media segments of media sequences to a media server proxy (152) on the client device (150) according to the second SMP. The remote server (110 . . . 11x) retrieves encoded data for media segments from memory or storage, which can be accessed through a storage area network (not shown) or accessed in another way. Responsive to requests, the remote server (110 . . . 11x) sends the encoded data to the media server proxy (152). The remote server (110 . . . 11x) can itself receive the encoded data in containers from another server. Alternatively, the remote server (110 . . . 11x) can include a media decoder, media encoder, container format sink, and/or container format source. A media encoder receives segments of media sequences and encodes the segments to produce encoded data compliant with a standardized format (such as AV1, H.265/HEVC, or H.266/VVC for video) or proprietary format. The media encoder can be a video encoder, audio encoder, or other type of media encoder. For transcoding between codec formats or bit rates, a media decoder receives encoded data compliant with a standardized format (such as AV1, H.265/HEVC, or H.266/VVC for video) or proprietary format and decodes the encoded data to produce reconstructed segments. The media decoder can be a video decoder, audio decoder, or other type of media decoder. A container format sink receives encoded data and organizes the encoded data in a media container according to a container format such as ISO/IEC 14496-12 (base media file format), ISO/IEC 14496-14 (MP4), ASF, WebM or another container format. For transcoding between container formats, a container format source removes encoded data for a segment of a media sequence, which is organized in the media container according to a container format such as ISO/IEC 14496-12 (base media file format), ISO/IEC 14496-14 (MP4), ASF, WebM or another container format.

The network (120) can be the Internet or a dedicated network connection.

Operations of the media server proxy (152) are detailed elsewhere. In general, the media server proxy (152) receives a request from the playback tool (154) according to the first SMP to provide information about media segments of a media sequence, generates such information, and provides the information to the playback tool (154). The media server proxy (152) requests encoded data for media segments from a remote server (110 . . . 11x) according to the second SMP. In turn, responsive to requests from the playback tool (154), the media server proxy (152) streams encoded data for media segments to the playback tool (154) according to the first SMP. The media server proxy (152) can include components as described with reference to FIG. 2 or have another architecture. For transcoding operations, the media server proxy (152) can include a media decoder and media encoder and/or include a container format sink and container format source, which operate as described with reference to the remote server (110 . . . 11x).

The playback tool (154) at the client device (150) requests information about media segments according to the first SMP and then requests encoded data for media segments according to the first SMP. The playback tool (154) receives encoded data for media segments from the media server proxy (152). The playback tool (154) includes a container format source and media decoder. The container format source receives and processes a media container, removing encoded data for a media segment of a media sequence, which is organized in the media container according to a container format such as ISO/IEC 14496-12 (base media file format), ISO/IEC 14496-14 (MP4), ASF, WebM or another container format. The media decoder receives encoded data compliant with a standardized format (such as AV1, H.265/HEVC, or H.266/VVC for video) or proprietary format and decodes the encoded data to produce reconstructed media segments. The media decoder can be a video decoder, audio decoder, or other type of media decoder.

Figure 1B:
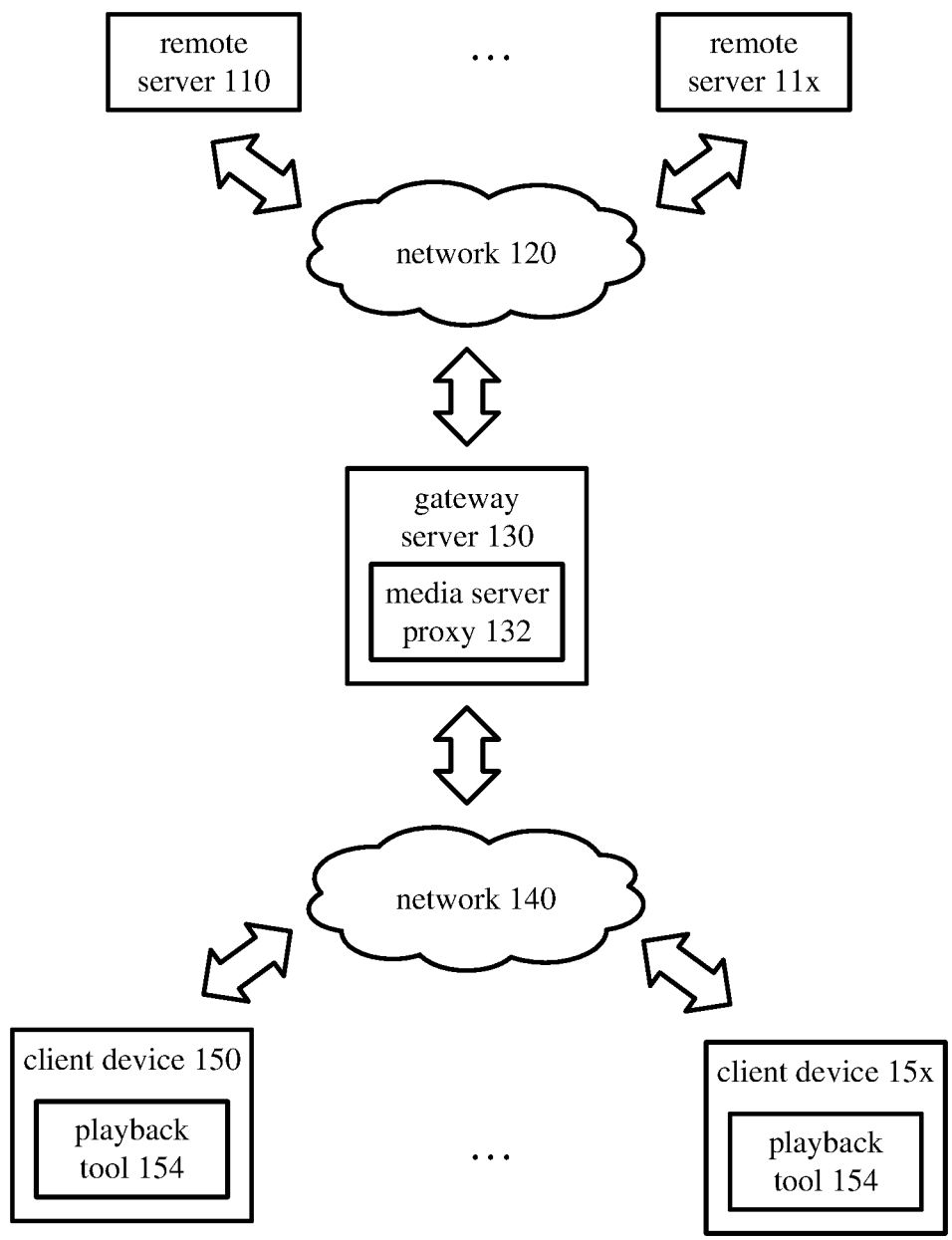

FIG. 1b shows an alternative media streaming environment (102) in which some described embodiments can be implemented. The media streaming environment (102) includes one or more remote servers (110 . . . 11x), a network (120), a gateway server (130), another network (140), and one or more client devices (150 . . . 15x). The gateway server (130) includes a media server proxy (132), which interacts with a playback tool (154) using a first SMP and interacts with a remote server (110 . . . 11x) according to a second SMP. A client device (150 . . . 15x) includes a playback tool (154).

A remote server (110 . . . 11x) stores and streams encoded data for media segments of media sequences. In general, the remote server (110 . . . 11x) operates as described with reference to FIG. 1a. The network (120) can be the Internet or a dedicated network connection.

The gateway server (130) can connect with multiple client devices (150 . . . 15x) over the network (140), which is typically a very fast local network. The media server proxy (132) potentially supports connections with playback tools (154) at multiple client devices (150 . . . 15x) according to the first SMP. In this way, encoded data for media segments can be shared between the playback tools (154) at multiple client devices (150 . . . 15x) and delivered according to the first SMP, instead of retrieving the encoded data separately for different playback tools.

Operations of the media server proxy (132) are detailed elsewhere. In general, the media server proxy (132) receives a request from a playback tool (154) according to the first SMP to provide information about media segments of a media sequence, generates such information (or reuses previously generated information), and provides the information to the playback tool (154). The media server proxy (132) requests encoded data for media segments from a remote server (110 . . . 11x) over the network (120) according to the second SMP. In turn, responsive to requests from a playback tool (154), the media server proxy (132) streams encoded data for media segments to the playback tool (154) according to the first SMP over the other network (140). The media server proxy (132) can include components as described with reference to FIG. 2 or have another architecture. For transcoding operations, the media server proxy (132) can include a media decoder and media encoder and/or include a container format sink and container format source, which operate as described with reference to the remote server (110 . . . 11x).

A playback tool (154) at a client device (150 . . . 15x) sends requests and receives encoded data over the network (140), instead of directly interacting with a media server proxy with no intervening network. Otherwise, a playback tool (154) at a client device (150 . . . 15x) operates as described with reference to FIG. 1a.

In some example implementations, a playback tool (154) as described with reference to FIG. 1a or FIG. 1b is a Web application that executes in a browser environment. When the playback tool and media server proxy interact using HLS, the Web application is configured for video-on-demand mode, as if the media segments were part of a static movie to play from the beginning to the end.

III. Example Media Server Proxy

Figure 2:
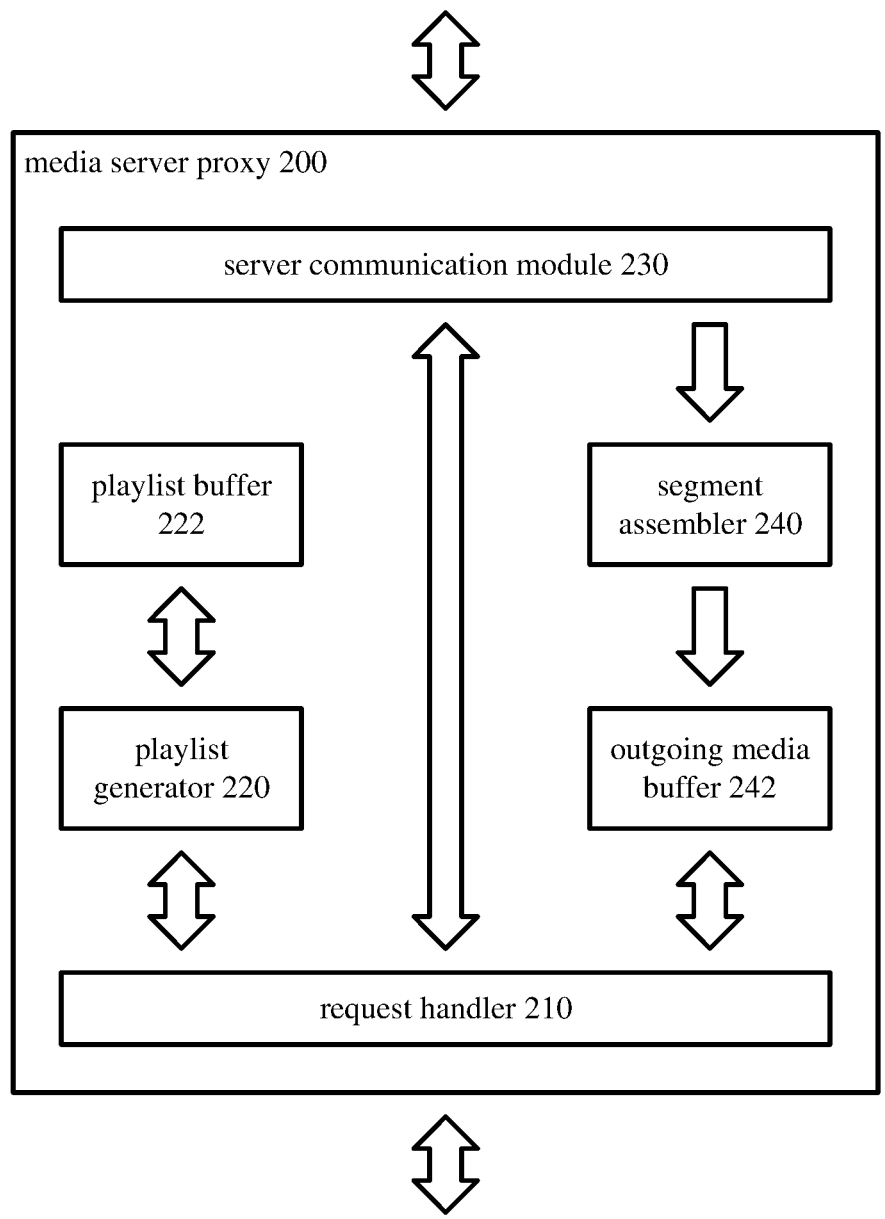
FIG. 2 is a diagram illustrating an example media server proxy in which some described embodiments can be implemented.

FIG. 2 shows an example media server proxy (200) in which some described embodiments can be implemented. The media server proxy (200) includes a request handler (210), a playlist generator (220), a playlist buffer (222), a server communication module (230), a segment assembler (240), and an outgoing media buffer (242).

The request handler (210) is configured to perform various request handling operations. For example, the request handling operations include receiving a request, from a playback tool, according to the first SMP to provide information about outgoing media segments of a media sequence, and sending, to the playback tool, the information about outgoing media segments. In later streaming, the request handling operations can include streaming, to the playback tool, outgoing media segments according to the first SMP.

The playlist generator (220) is configured to generate the information about outgoing media segments. The organization of the information about outgoing media segments depends on implementation. In some example implementations, the information about outgoing media segments is organized as a playlist. For a given outgoing media segment, the information about outgoing media segments can include a location of the given outgoing media segment, a file name of the given outgoing media segment, a bit rate of the given outgoing media segment, a resolution of the given outgoing media segment, a timestamp of the given outgoing media segment, a duration of the given outgoing media segment, and/or other information about the given outgoing media segment. Alternatively, the information about outgoing media segments can be organized in some other way. In any case, the playlist buffer (222) is configured to store the information about the outgoing media segments, for delivery to a playback tool.

The server communication module (230) is configured to perform various retrieval operations. For example, the retrieval operations include retrieving, from a remote server, incoming media content for the media sequence according to a second SMP different than the first SMP. The incoming media content can be temporarily stored in an incoming media buffer (not shown) of the media server proxy (200).

The segment assembler (240) is configured to perform various assembly operations. For example, the assembly operations include assembling the outgoing media segments based at least in part on the incoming media content. The assembly operations can also include operations to repackage media segments, operations to transcode between container formats, operations to transcode between codec formats, and/or operations to transcode between bit rates/quality levels. For assembly operations, the segment assembler (240) or, more generally, the media server proxy (200), can include a media decoder, media encoder, container format sink, and/or container format source. A media encoder receives segments of media sequences and encodes the segments to produce encoded data compliant with a standardized format (such as AV1, H.265/HEVC, or H.266/VVC for video) or proprietary format. The media encoder can be a video encoder, audio encoder, or other type of media encoder. For transcoding between codec formats or bit rates, a media decoder receives encoded data compliant with a standardized format (such as AV1, H.265/HEVC, or H.266/VVC for video) or proprietary format and decodes the encoded data to produce reconstructed segments. The media decoder can be a video decoder, audio decoder, or other type of media decoder. A container format sink receives encoded data and organizes the encoded data in a media container according to a container format such as ISO/IEC 14496-12 (ISO base media file format), ISO/IEC 14496-14 (MP4), ASF, WebM or another container format. For transcoding between container formats, a container format source removes encoded data for a segment of a media sequence, which is organized in the media container according to a container format such as ISO/IEC 14496-12 (ISO base media file format), ISO/IEC 14496-14 (MP4), ASF, WebM or another container format. The outgoing media buffer (242) stores encoded data in containers for media segments.

In some example implementations, a media server proxy (200) as described with reference to FIG. 2 is implemented using a service worker. At a client device or gateway server, the service worker is situated between a playback tool and the network that connects the service worker to a remote server. The service worker can intercept requests from the playback tool and take appropriate action. In general, the service worker is an event-driven worker, which can be registered against an origin and a path. The service worker can control a remote server associated with the service worker, intercepting and modifying requests for media segments.

A service worker runs in a worker context, on a different thread from other applications. The service worker can run asynchronously, in a non-blocking manner, compared to the other applications.

The service worker can be implemented using a JavaScript file. For a service worker executing on a client device, code for the service worker can be fetched and registered from a call on a Web page. When the Web page is retrieved and rendered, code for the service worker is also retrieved from a remote server, and the service worker is registered at the client device. The service worker has an associated scope of media segments (more generally, assets or resources) accessible through the service worker. The service worker is installed at the client device, and buffers are set up for media segments at the client device. The service worker is then activated. The service worker retrieves (fetches) media segments from the remote server using the second SMP. Using the first SMP, the service worker streams media segments to the playback tool upon request from the playback tool (where the request has a URL that is in scope for the service worker).

Some client devices support HLS but not other SMPs. Such client devices might also require that a media file (for a media segment) be completely downloaded before playback begins. Even for such devices, a service worker can implement a media server proxy and overcome the deficiencies of HLS.

Alternatively, the media server proxy can be implemented using a Media Source Extensions ("MSE") application programming interface ("API"). In this case, the media server proxy is implemented using a JavaScript file for the MSE API.

IV. Example Media Server Proxy Operations

Figure 3A:
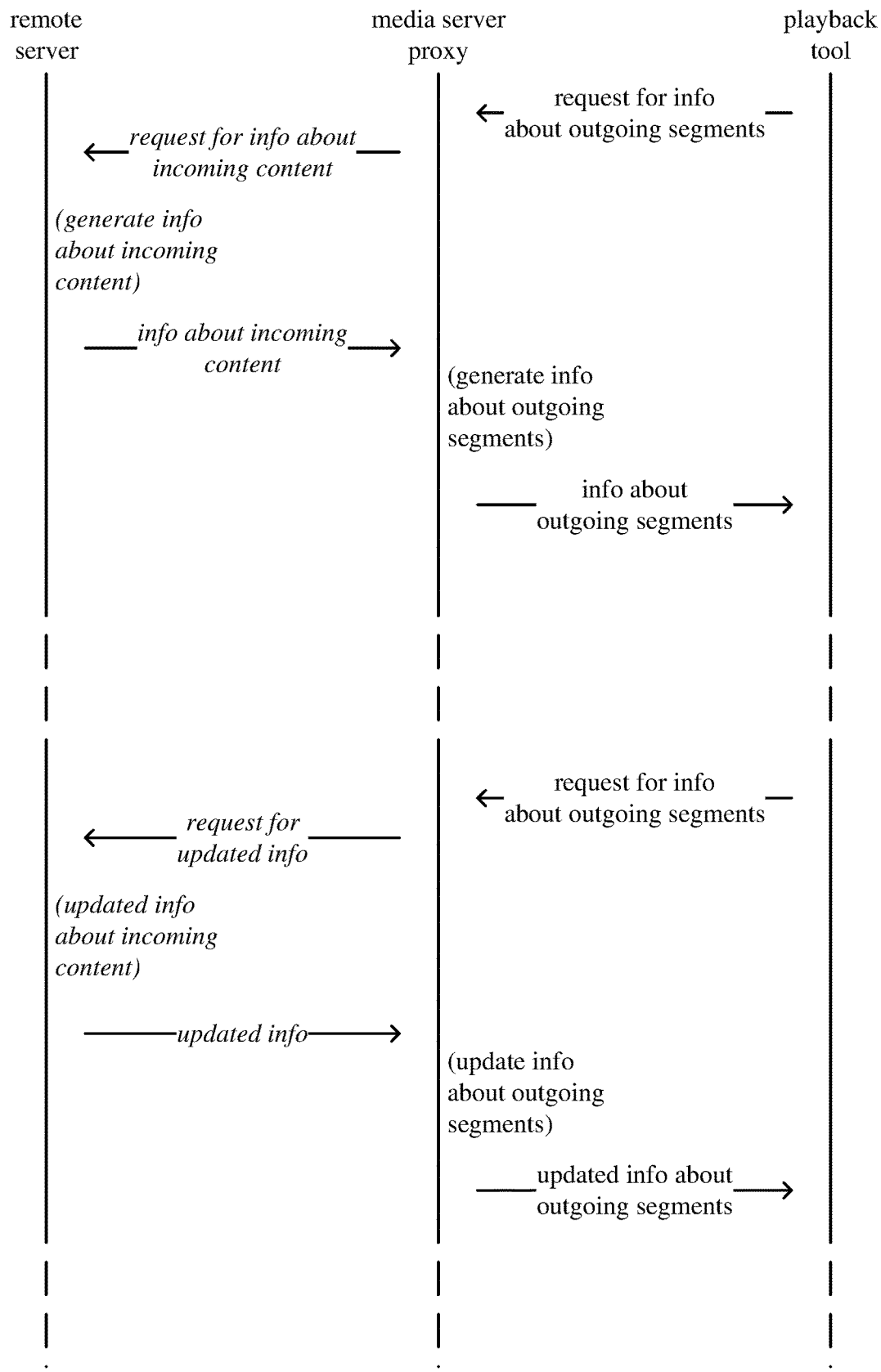
FIGS. 3a-3c are diagrams illustrating operations of a media server proxy that switches streaming media protocols ("SMPs").
Figure 3B:
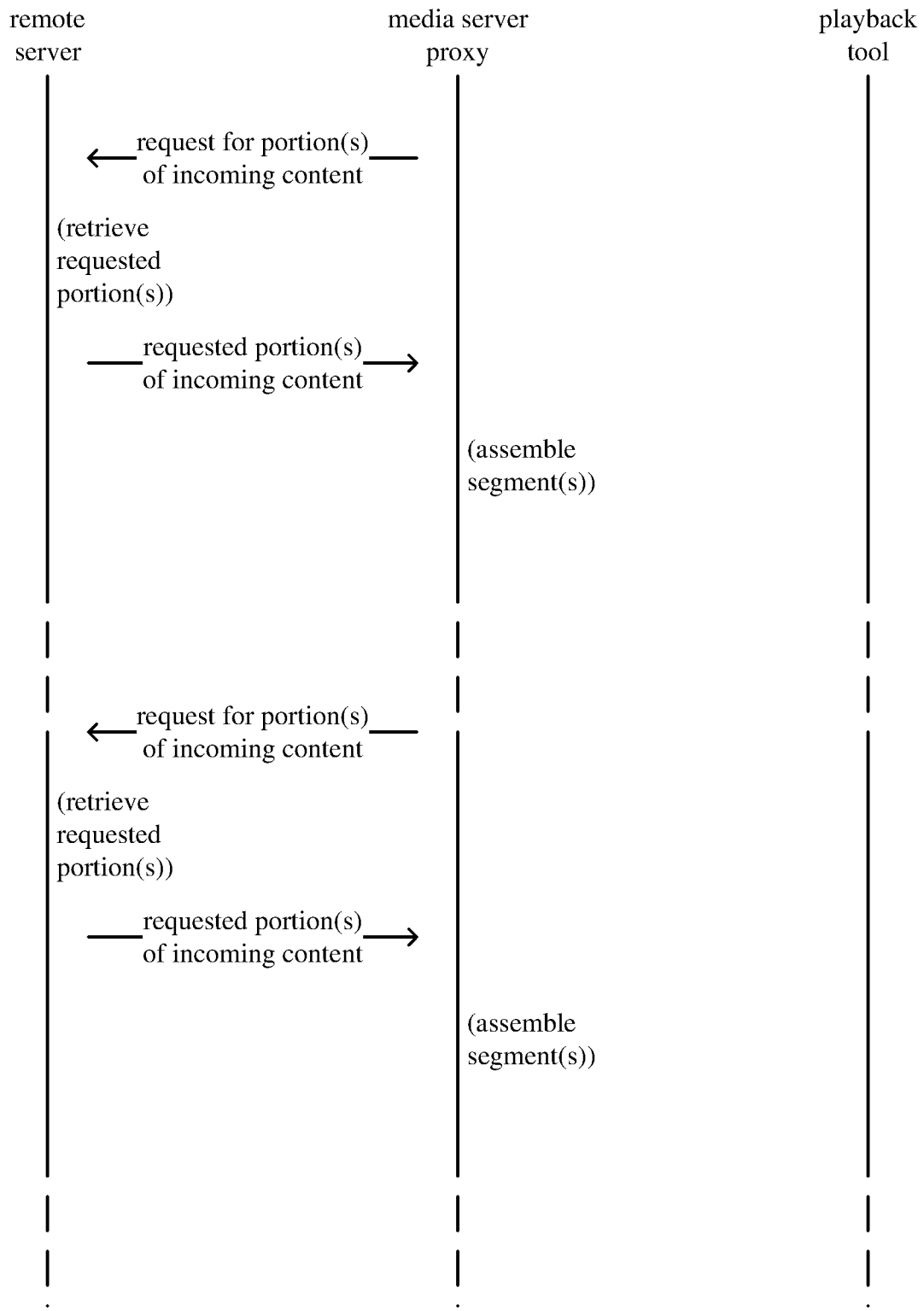
Figure 3C:
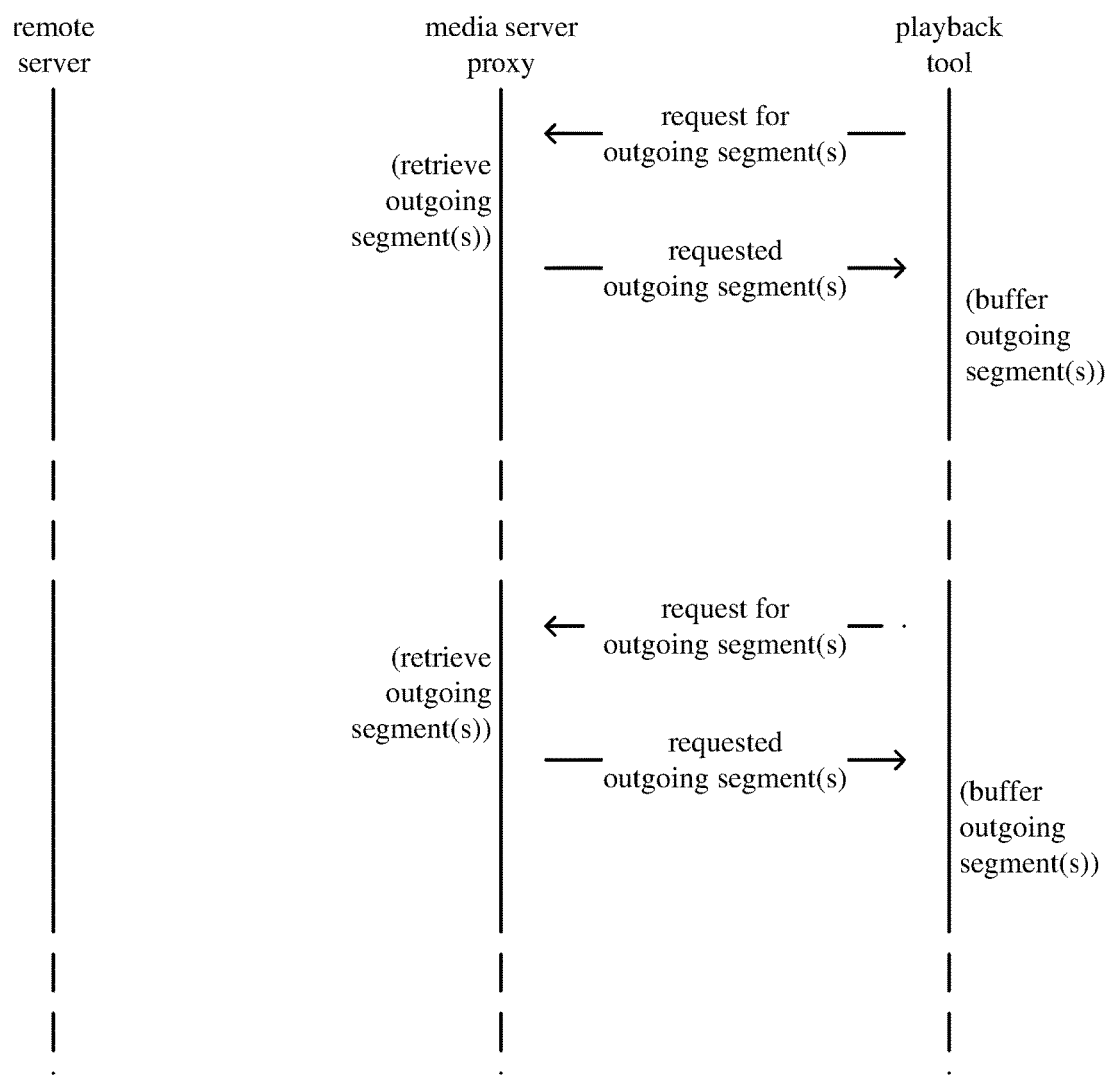

FIGS. 3a-3c show various operations (300, 310, 320) of a media server proxy that switches SMPs. A media server proxy as described with reference to FIG. 1a, 1b, or 2 or other media server proxy can perform the operations (300, 310, 320). The media server proxy can perform different operations concurrently and asynchronously. For example, the media server proxy can perform operations to retrieve media segments from a remote server while performing operations to stream (earlier) media segments to a playback tool.

FIG. 3a shows operations (300) to generate and update information about media segments of a media sequence according to a first SMP. The media server proxy receives a request to provide information about outgoing media segments of a media sequence. The media server proxy generates the information about outgoing media segments and sends the information about outgoing media segments to the playback tool.

In some example implementations, the media server proxy generates the information about outgoing media segments based on defined patterns of organization of segments, without checking with the remote server about incoming media content available at the remote server. Alternatively, as shown in FIG. 3a, the media server proxy can send a request, to the remote server, to provide information about incoming media content. In this case, the remote server generates information about incoming media content and sends the information about incoming media content to the media server proxy. Upon receipt of the information about incoming media content, the media server proxy can use the information about incoming media content when generating the information about outgoing media segments.

The media server proxy can, periodically and/or upon request from the playback tool or remote server, update and resend the information about outgoing media segments to the playback tool. The updated information can list new outgoing media segments for a long sequence. Or, the updated information can account for rate control decisions made by the media server proxy and/or remote server to adjust the bit rate (and quality level) of encoded data for the media segments.

For example, as shown in FIG. 3a, the media server proxy can receive a request to provide (updated) information about outgoing media segments. The media server proxy updates the information about outgoing media segments and sends the updated information about outgoing media segments to the playback tool. In doing so, the media server proxy can update the information about outgoing media segments based on defined patterns of organization of segments, without checking with the remote server, or the media server proxy can coordinate with the remote server. For example, as shown in FIG. 3a, the media server proxy can send a request, to the remote server, to provide updated information about incoming media content. In this case, the remote server updates information about incoming media content and sends the updated information about incoming media content to the media server proxy. Upon receipt of the updated information about incoming media content, the media server proxy can use the updated information about incoming media content when updating the information about outgoing media segments.

FIG. 3b shows operations (310) to retrieve media segments from a remote server according to a second SMP different than the first SMP. The media server proxy sends a request, to the remote server, to provide one or more portions of incoming media content. The remote server retrieves the requested portion(s) of incoming media content. For example, the remote server retrieves the requested portion(s) of incoming media content from memory or storage accessible to the remote server. The remote server sends the requested portion(s) of incoming media content to the media server proxy. Upon receipt, the media server proxy can buffer the portion(s) of incoming media content in an incoming media buffer. The incoming media buffer can be the same as the outgoing media buffer used to store outgoing media segments or can be a different buffer.

The media server proxy assembles one or more outgoing media segments based at least in part on the portion(s) of incoming media content retrieved from the remote server. The assembling can include repackaging operations and/or transcoding operations, or the assembling can simply include passing through the portion(s) of incoming media content for use as the outgoing media segment(s). The outgoing media segment(s) are then stored in an outgoing media buffer for subsequent streaming.

In some examples, portion(s) of incoming media content retrieved from the remote server are streamed, as outgoing media segment(s), to the playback tool in a "pass through" operation. In other words, for the assembling operation, the media server proxy sets the outgoing media segment(s) to stream from the portion(s) of incoming media content. The outgoing media segment(s) are portion(s) of incoming media content that have been retrieved and buffered, with each of the portion(s) of incoming media content providing a corresponding one of the outgoing media segment(s).

In other examples, for the assembling operation, the media server proxy repackages the portion(s) of incoming media content that have been retrieved from the remote server, for streaming as one or more outgoing media segments to the playback tool. For example, a single portion of incoming media content that has been retrieved can be split into multiple outgoing media segments for streaming. Alternatively, multiple portions of incoming media content that have been retrieved can be combined into a single outgoing media segment for streaming. More generally, a set of m portions of incoming media content that have been retrieved from the remote server is repackaged as a set of n outgoing media segments to be streamed to the playback tool, wherein m and n are natural numbers, and m is not equal to n.

In still other examples, for the assembling operation, the media server proxy transcodes the portion(s) of incoming media content retrieved from the remote server between container formats and/or transcodes the portion(s) of incoming media content between media codec formats or bit rates/quality levels, to produce one or more outgoing media segments that are streamed to the playback tool. For example, for a given portion of incoming media content retrieved from the remote server, the media server proxy transcodes the given portion from a source container format to a target container format different than the source container format. This produces a version of the given portion in the target container format. The version of the given portion in the target container format provides a corresponding outgoing media segment. Or, as another example, for a given portion of incoming media content retrieved from the remote server, the media server proxy transcodes the given portion from a source media codec format to a target media codec format different than the source media codec format. This produces a version of the given portion in the target media codec format. The version of the given portion in the target media codec format provides a corresponding outgoing media segment among the outgoing media segments.

In still other examples, the media server proxy performs transcoding operations, as described above, and also repackages a set of m portions of incoming media content that have been retrieved from the remote server as a set of n outgoing media segments to be streamed to the playback tool.

As shown in FIG. 3b, the media server proxy iteratively performs operations (310) to retrieve portions of incoming media content from the remote server according to the second SMP and assemble outgoing media segments from the retrieved portions of incoming media content. For example, the media server proxy sends a request, to the remote server, to provide one or more additional portions incoming media content. The remote server retrieves the requested additional portion(s) of incoming media content and sends the requested additional portion(s) of incoming media content to the media server proxy. Upon receipt, the media server proxy can buffer the additional portion(s) of incoming media content. The media server proxy assembles one or more additional outgoing media segments based at least in part on the additional portion(s) of incoming media content retrieved from the remote server. The additional outgoing media segment(s) are then stored for subsequent streaming in the outgoing media buffer.

FIG. 3c shows operations (320) to stream media segments to a playback tool according to the first SMP. The media server proxy receives a request, from a playback tool, to provide one or more outgoing media segments and retrieves the requested outgoing media segment(s) from memory or storage. If a requested outgoing media segment is not yet available to the media server proxy, the media server proxy can request encoded data for the media segment from the remote server according to the second SMP as described with reference to FIG. 3b. The media server proxy sends the requested outgoing media segment(s) to the playback tool. Upon receipt, the playback tool buffers the requested outgoing media segment(s) for subsequent decoding and playback.

As shown in FIG. 3c, the media server proxy iteratively performs operations (320) to stream media segments to a playback tool according to the first SMP. For example, the media server proxy receives a request, from the playback tool, to provide one or more additional outgoing media segments and retrieves the requested additional outgoing media segment(s) from memory or storage (or retrieves encoded data for them from the remote server, as described with reference to FIG. 3b). The media server proxy sends the requested additional outgoing media segment(s) to the playback tool. Upon receipt, the playback tool buffers the requested additional outgoing media segment(s) for subsequent decoding and playback.

V. Example Techniques for Switching Streaming Media Protocols

Figure 4A:
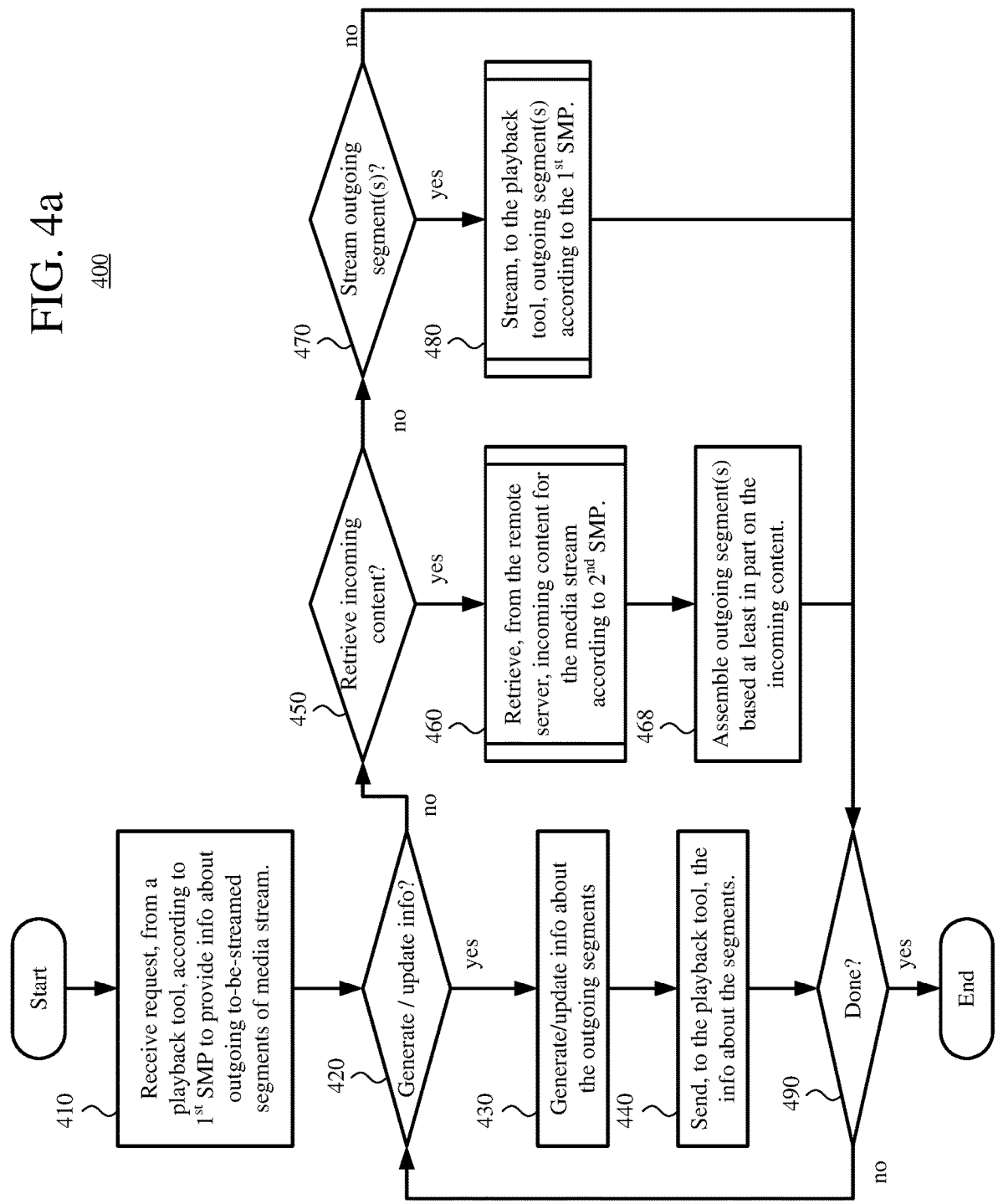
FIG. 4a is a flowchart illustrating an example technique for streaming media segments using a media server proxy that switches SMPs.

FIG. 4a shows an example technique (400) for switching streaming media protocols ("SMPs") using a media server proxy. FIGS. 4b and 4c show example retrieval operations (401) and streaming operations (402), respectively, according to the example technique (400) shown in FIG. 4a. The media server proxy and a playback tool can be hosted on the same client device, as described with reference to FIG. 1a. Or, the media server proxy can be hosted on a gateway server as described with reference to FIG. 1b, in which case one or more playback tools are hosted on respective client devices connected over a local network to the gateway server. More generally, a media server proxy as described above with reference to FIGS. 1a, 1b, and 2, or another media server proxy, can perform the techniques (400-402).

In general, the media server proxy appears, to a playback tool, to be a remote server that streams media segments according to a first SMP. To the remote server, the media server proxy appears to be a local client that retrieves media content according to a second SMP, which is different than the first SMP. For example, the first SMP is HTTP Live Streaming ("HLS"), and the second SMP is a low-latency proprietary media streaming protocol. Alternatively, the first SMP is a different SMP (such as Dynamic Adaptive Streaming over HTTP ("DASH") or Microsoft Smooth Streaming ("MSS")) and/or the second SMP is a different SMP (such as Secure Reliable Transport ("SRT") or Faster-Than-Light ("FTL")).

With reference to FIG. 4a, to start, the media server proxy receives (410) a request, from a playback tool, according to the first SMP to provide information about outgoing (to-be-streamed) media segments of a media sequence. The media sequence includes video content, audio content, closed captioning content, augmented reality content, virtual reality content, and/or another type of media content.

Depending on implementation, the media server proxy can use any of several mechanisms to receive the request to provide the information about outgoing media segments. For example, the media server proxy intercepts the request to provide the information about outgoing media segments. Based at least in part on the request, the media server proxy identifies the remote server in a list of servers for which the media server proxy acts as an intermediary. Or, as another example, the request to provide the information about outgoing media segments is part of a pseudo-URL that identifies the media server proxy. In particular, in some example implementations, the playback tool is a Web application that is executable in a browser environment, and the media server proxy is a service worker. The pseudo-URL is a call to register the service worker. The outgoing media segments, in turn, are resources that are in scope for the service worker. Alternatively, the media server proxy receives the request to provide the information about outgoing media segments in some other way.

With reference to FIG. 4a, as part of a processing loop, the media server proxy selectively performs operations to generate or update information about outgoing media segments of the media sequence, operations to retrieve incoming media content for the media sequence from the remote server, and operations to stream outgoing media segments to the playback tool. The media server proxy can perform some operations concurrently and asynchronously from other operations. For example, the media server proxy can retrieve incoming media content of the media sequence from the remote server while streaming outgoing media segments (earlier in the media sequence) to the playback tool. The media server proxy can iteratively perform operations (e.g., iteratively retrieve portions of incoming media content from the remote server, iteratively stream outgoing media segments to the playback tool).

With reference to FIG. 4a, the media server proxy determines (420) whether to generate or update information about the outgoing media segments of the media sequence. If so, for example, the media server proxy generates (430) information about the outgoing media segments and sends (440), to the playback tool, the information about the outgoing media segments. In some example implementations, the media server proxy generates the information about the outgoing media segments based on defined patterns of organization of segments, without checking with the remote server about incoming media content available at the remote server. Alternatively, the media server proxy can send a request, to the remote server, to provide information about the incoming media content and receive the information about the incoming media content. In this case, the media server proxy uses the information about the incoming media content when generating the information about the outgoing media segments of the media sequence.

With reference to FIG. 4a, when the media server proxy does not generate or update information about the outgoing media segments, the media server proxy determines (450) whether to retrieve incoming media content for the media sequence from the remote server. If so, the media server proxy performs operations to retrieve (460), from the remote server, incoming media content of the media sequence according to the second SMP.

The operations performed by the media server proxy to retrieve (460) the incoming media content of the media sequence according to the second SMP depend on implementation. For example, the media server proxy iteratively performs retrieval operations according to the operations (401) shown in FIG. 4b. The media server proxy sends (462) a request, to the remote server, to provide a given portion of incoming media content. The media server proxy later receives (464) the given portion of incoming media content from the remote server and buffers (466) the given portion of incoming media content in an incoming media buffer. The incoming media buffer can be the same as the outgoing media buffer used to store outgoing media segments or can be a different buffer. Alternatively, the media server proxy performs other operations to retrieve (460) the incoming media content of the media sequence according to the second SMP.

The media server proxy assembles (468) the outgoing media segments based at least in part on the incoming media content retrieved from the remote server. The assembling (468) can include repackaging operations and/or transcoding operations, as described with reference to FIG. 3b, or the assembling (468) can simply include passing through portions of incoming media content for use as the outgoing media segments, as described with reference to FIG. 3b. After the assembling (468), a given outgoing media segment is typically a file of encoded media data in a container. The encoded media data is organized according to a media codec format, and the container is organized according to a container format. The outgoing media segments are then stored in an outgoing media buffer for subsequent streaming.

With reference to FIG. 4a, when the media server proxy does not generate or update information about the outgoing media segments and does not retrieve incoming media content from the remote server, the media server proxy determines (470) whether to stream outgoing media segments to the playback tool. If so, the media server proxy performs operations to stream (480), to the playback tool, outgoing media segments of the media sequence according to the first SMP.

The operations performed by the media server proxy to stream (480) outgoing media segments of the media content according to the first SMP depend on implementation. For example, the media server proxy iteratively performs streaming operations according to the operations (402) shown in FIG. 4c. The media server proxy receives (482) a request, from a playback tool, to provide a given outgoing media segment among the outgoing media segments, retrieves (484) the given outgoing media segment from the outgoing media buffer, and sends (486) the given outgoing media segment to the playback tool. Alternatively, the media server proxy performs other operations to stream (480) outgoing media segments of the media content according to the first SMP.

The media server proxy checks (490) whether to continue operations as part of its processing loop. If so, the media server proxy selectively performs operations to generate or update information about the outgoing media segments of the media sequence, operations to retrieve incoming media content of the media sequence from the remote server, and operations to stream outgoing media segments to the playback tool.

During streaming, the media server proxy can update the information about outgoing media segments of the media sequence. For example, the media server proxy updates the information about the outgoing media segments to include new outgoing media segments then sends, to the playback tool, the updated information about the outgoing media segments. The media server proxy can also implement rate control according to the second SMP. For example, the media server proxy determines an adjustment to bit rate of the media sequence. For server-side rate control, the media server proxy can receive, from the remote server, an indication of the adjustment to the bit rate of the media sequence and determine the adjustment accordingly. Alternatively, for client-side (here, proxy-side) rate control, the media server proxy can measure one or more factors (based on packet loss or latency) and determine the adjustment accordingly. In any case, based at least in part on the adjustment to the bit rate of the media content, the media server proxy updates the information about the outgoing media segments to include new outgoing media segments. The media server proxy then sends, to the playback tool, the updated information about the outgoing media segments. The media server proxy subsequently retrieves incoming media content of the media sequence from the remote server at the new bit rate and streams outgoing media segments to the playback tool at the new bit rate.

In many of the preceding examples, the media server proxy retrieves incoming media content for a media sequence from a single remote server. In practice, the media server proxy can retrieve incoming media content from one or more other remote servers. Thus, the media server proxy can retrieve incoming media content for a media sequence from multiple remote servers for different portions of the media sequence, and interleave retrieved portions for the media sequence.

The media server proxy can also compose retrieved portions for multiple media sequences into a single composite media sequence. The media server proxy can combine incoming media content from multiple remote servers or a single remote server into a composite sequence, such that the composite sequence includes multiple picture windows or overlapping media content. For example, in addition to retrieving a given portion of incoming media content from a remote server, the media server proxy identifies one or more other portions of another media sequence. The media server proxy composes the given portion of incoming media content and the identified other portion(s) into a given outgoing media segment among the outgoing media segments.

VI. Example Technical Advantages

When streaming media segments from a remote server over the Internet, some playback tools support only a conventional SMP such as HLS or DASH. Such a conventional SMP may be unsuitable for a particular usage scenario. For example, buffering settings or congestion control operations according to the conventional SMP may prevent a playback tool from achieving ultra-low latency in delivery of encoded data, even if a network would otherwise allow ultra-low-latency delivery. As another example, flow control operations according to the conventional SMP may interfere with timely delivery of encoded data over a lossy network. As another example, client-side operations to compose streams might not be supported using the conventional SMP. Approaches described herein provide technical solutions to these technical problems and other technical problems, and thereby provide various technical advantages.

For example, using approaches described herein, a media server proxy can manage delivery of media segments from a remote server to a playback tool with ultra-low latency, even when the playback tool supports only a conventional SMP. In some example implementations, the latency is on the order of 500 milliseconds or less.

As another example, using approaches described herein, a media server proxy can manage delivery of media segments over a lossy network, even when a playback tool supports only a conventional SMP. By using a different SMP over the lossy network, the media server proxy can avoid flow control operations according to the conventional SMP, which would otherwise interfere with timely delivery of encoded data.

As another example, using approaches described herein, a media server proxy can compose media segments from multiple sequences for playback in a single media sequence, which can then be streamed to a playback tool using a conventional SMP.

As another example, using approaches described herein, a media server proxy decouples the SMP used to interact with a remote server from the SMP used to interact with a playback tool. This allows the media server proxy to use a conventional SMP supported by the playback tool, without reimplementing the playback tool, which might be provided by a third party. At the same time, the media server proxy can use a different SMP for "over-the-wire" exchanges with the remote server. This enables innovation for the different SMP to address deficiencies of the conventional SMP, such as long latency and performance problems on lossy networks.

VII. Example Computer Systems

Figure 5:
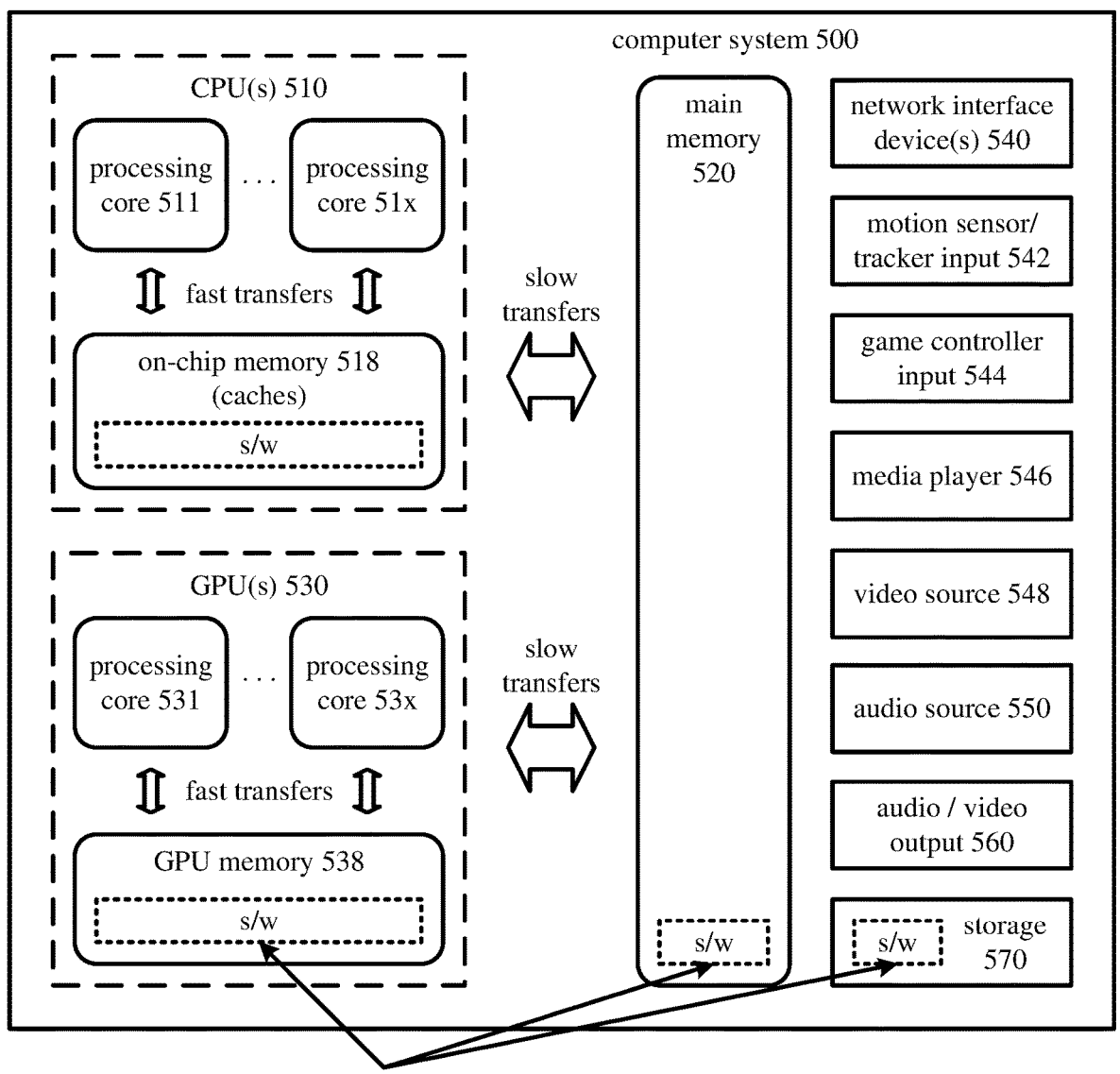
FIG. 5 is a diagram illustrating an example computer system in which some described embodiments can be implemented.

FIG. 5 illustrates a generalized example of a suitable computer system (500) in which several of the described innovations may be implemented. The innovations described herein relate to a media server proxy that switches SMPs. The computer system (500) is not intended to suggest any limitation as to scope of use or functionality, as the innovations may be implemented in diverse computer systems, including special-purpose computer systems.

With reference to FIG. 5, the computer system (500) includes one or more processing cores (510 . . . 51x) and local memory (518) of a central processing unit ("CPU") or multiple CPUs. The processing core(s) (510 . . . 51x) are, for example, processing cores on a single chip, and execute computer-executable instructions. The number of processing core(s) (510 . . . 51x) depends on implementation and can be, for example, 4 or 8. The local memory (518) may be volatile memory (e.g., registers, cache, random access memory ("RAM")), non-volatile memory (e.g., read-only memory ("ROM"), electrically erasable programmable ROM ("EEPROM"), flash memory), or some combination of the two, accessible by the respective processing core(s) (510 . . . 51x). Alternatively, the processing cores (510 . . . 51x) can be part of a system-on-a-chip ("SoC"), application-specific integrated circuit ("ASIC"), or other integrated circuit.

The local memory (518) can store software (580) implementing aspects of the innovations for a media server proxy that switches SMPs, for operations performed by the respective processing core(s) (510 . . . 51x), in the form of computer-executable instructions. In FIG. 5, the local memory (518) is on-chip memory such as one or more caches, for which access operations, transfer operations, etc. with the processing core(s) (510 . . . 51x) are fast.

The computer system (500) also includes processing cores (530 . . . 53x) and local memory (538) of a graphics processing unit ("GPU") or multiple GPUs. The number of processing cores (530 . . . 53x) of the GPU depends on implementation. The processing cores (530 . . . 53x) are, for example, part of single-instruction, multiple data ("SIMD") units of the GPU. The SIMD width n, which depends on implementation, indicates the number of elements (sometimes called lanes) of a SIMD unit. For example, the number of elements (lanes) of a SIMD unit can be 16, 32, 64, or 128 for an extra-wide SIMD architecture. The GPU memory (538) may be volatile memory (e.g., registers, cache, RAM), non-volatile memory (e.g., ROM, EEPROM, flash memory), or some combination of the two, accessible by the respective processing cores (530 . . . 53x). The GPU memory (838) can store software (580) implementing aspects of the innovations for a media server proxy that switches SMPs, for operations performed by the respective processing cores (530 . . . 53x), in the form of computer-executable instructions such as shader code.

The computer system (500) includes main memory (520), which may be volatile memory (e.g., RAM), non-volatile memory (e.g., ROM, EEPROM, flash memory), or some combination of the two, accessible by the processing core(s) (510 . . . 51x, 530 . . . 53x). The main memory (520) stores software (580) implementing aspects of the innovations for a media server proxy that switches SMPs, in the form of computer-executable instructions. In FIG. 5, the main memory (520) is off-chip memory, for which access operations, transfer operations, etc. with the processing cores (510 . . . 51x, 530 . . . 53x) are slower.

More generally, the term "processor" refers generically to any device that can process computer-executable instructions and may include a microprocessor, microcontroller, programmable logic device, digital signal processor, and/or other computational device. A processor may be a processing core of a CPU, other general-purpose unit, or GPU. A processor may also be a specific-purpose processor implemented using, for example, an ASIC or a field-programmable gate array ("FPGA"). A "processor system" is a set of one or more processors, which can be located together or distributed across a network. An operation performed by a processor system can be performed by one processor of the processor system, with different processors performing different operations, or multiple processors of the processor system can perform a given operation. (Depending on implementation, each processor of the processor system might, or might not, be capable of performing all of the operations of a given subset of the operations.)

The term "control logic" refers to a controller or, more generally, one or more processors, operable to process computer-executable instructions, determine outcomes, and generate outputs. Depending on implementation, control logic can be implemented by software executable on a CPU, by software controlling special-purpose hardware (e.g., a GPU or other graphics hardware), or by special-purpose hardware (e.g., in an ASIC).

The computer system (500) includes one or more network interface devices (540). The network interface device(s) (540) enable communication over a network to another computing entity (e.g., server, other computer system). The network interface device(s) (540) can support wired connections and/or wireless connections, for a wide-area network, local-area network, personal-area network, or other network. For example, the network interface device(s) can include one or more Wi-Fi® transceivers, an Ethernet® port, a cellular transceiver and/or another type of network interface device, along with associated drivers, software, etc. The network interface device(s) (540) convey information such as computer-executable instructions, audio or video input or output, or other data in a modulated data signal over network connection(s). A modulated data signal is a signal that has one or more of its characteristics set or changed in such a manner as to encode information in the signal. By way of example, the network connections can use an electrical, optical, RF, or other carrier.

The computer system (500) optionally includes a motion sensor/tracker input (542) for a motion sensor/tracker, which can track the movements of a user and objects around the user. For example, the motion sensor/tracker allows a user (e.g., player of a game) to interact with the computer system (500) through a natural user interface using gestures and spoken commands. The motion sensor/tracker can incorporate gesture recognition, facial recognition and/or voice recognition.

The computer system (500) optionally includes a game controller input (544), which accepts control signals from one or more game controllers, over a wired connection or wireless connection. The control signals can indicate user inputs from one or more directional pads, buttons, triggers and/or one or more joysticks of a game controller. The control signals can also indicate user inputs from a touchpad or touchscreen, gyroscope, accelerometer, angular rate sensor, magnetometer and/or other control or meter of a game controller.

The computer system (500) optionally includes a media player (546) and video source (548). The media player (546) can play DVDs, Blu-Ray™ discs, other disc media and/or other formats of media. The video source (548) can be a camera input that accepts video input in analog or digital form from a video camera, which captures natural video. Or the video source (548) can be a screen capture module (e.g., a driver of an operating system, or software that interfaces with an operating system) that provides screen capture content as input. Or the video source (548) can be a graphics engine that provides texture data for graphics in a computer-represented environment. Or the video source (548) can be a video card, TV tuner card, or other video input that accepts input video in analog or digital form (e.g., from a cable input, High-Definition Multimedia Interface ("HDMI") input or other input).

An optional audio source (550) accepts audio input in analog or digital form from a microphone, which captures audio, or other audio input.

The computer system (500) optionally includes a video output (860), which provides video output to a display device. The video output (560) can be an HDMI output or other type of output. An optional audio output (560) provides audio output to one or more speakers.

The storage (570) may be removable or non-removable, and includes magnetic media (such as magnetic disks, magnetic tapes or cassettes), optical disk media and/or any other media which can be used to store information, and which can be accessed within the computer system (500). The storage (570) stores instructions for the software (580) implementing aspects of the innovations for a media server proxy that switches SMPs.

The computer system (500) may have additional features. For example, the computer system (500) includes one or more other input devices and/or one or more other output devices. The other input device(s) may be a touch input device such as a keyboard, mouse, pen, or trackball, a scanning device, or another device that provides input to the computer system (500). The other output device(s) may be a printer, CD-writer, or another device that provides output from the computer system (500).

An interconnection mechanism (not shown) such as a bus, controller, or network interconnects the components of the computer system (500). Typically, operating system software (not shown) provides an operating environment for other software executing in the computer system (500), and coordinates activities of the components of the computer system (500).

The computer system (500) of FIG. 5 is a physical computer system. A virtual machine can include components organized as shown in FIG. 5.

The term "application" or "program" refers to software such as any user-mode instructions to provide functionality. The software of the application (or program) can further include instructions for an operating system and/or device drivers. The software can be stored in associated memory. The software may be, for example, firmware. While it is contemplated that an appropriately programmed general-purpose computer or computing device may be used to execute such software, it is also contemplated that hard-wired circuitry or custom hardware (e.g., an ASIC) may be used in place of, or in combination with, software instructions. Thus, examples described herein are not limited to any specific combination of hardware and software.

The term "computer-readable medium" refers to any medium that participates in providing data (e.g., instructions) that may be read by a processor and accessed within a computing environment. A computer-readable medium may take many forms, including non-volatile media and volatile media. Non-volatile media include, for example, optical or magnetic disks and other persistent memory. Volatile media include dynamic random-access memory ("DRAM"). Common forms of computer-readable media include, for example, a solid-state drive, a flash drive, a hard disk, any other magnetic medium, a CD-ROM, DVD, any other optical medium, RAM, programmable read-only memory ("PROM"), erasable programmable read-only memory ("EPROM"), a USB memory stick, any other memory chip or cartridge, or any other medium from which a computer can read. The term "non-transitory computer-readable media" specifically excludes transitory propagating signals, carrier waves, and wave forms or other intangible or transitory media that may nevertheless be readable by a computer. The term "carrier wave" may refer to an electromagnetic wave modulated in amplitude or frequency to convey a signal.

The innovations can be described in the general context of computer-executable instructions being executed in a computer system on a target real or virtual processor. The computer-executable instructions can include instructions executable on processing cores of a general-purpose processor to provide functionality described herein, instructions executable to control a GPU or special-purpose hardware to provide functionality described herein, instructions executable on processing cores of a GPU to provide functionality described herein, and/or instructions executable on processing cores of a special-purpose processor to provide functionality described herein. In some implementations, computer-executable instructions can be organized in program modules. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

Computer-executable instructions that implement innovations described herein can be received at a computer system and installed at the computer system. In particular, the computer system receives software that includes the computer-executable instructions. With the software, the computer system is configured to perform operations according to the computer-executable instructions.

The terms "system" and "device" are used interchangeably herein. Unless the context clearly indicates otherwise, neither term implies any limitation on a type of computer system or device. In general, a computer system or device can be local or distributed, and a computer system or device can include any combination of special-purpose hardware and/or hardware with software implementing the functionality described herein.

Numerous examples are described in this disclosure and are presented for illustrative purposes only. The described examples are not, and are not intended to be, limiting in any sense. The presently disclosed innovations are widely applicable to numerous contexts, as is readily apparent from the disclosure. One of ordinary skill in the art will recognize that the disclosed innovations may be practiced with various modifications and alterations, such as structural, logical, software, and electrical modifications. Although particular features of the disclosed innovations may be described with reference to one or more particular examples, it should be understood that such features are not limited to usage in the one or more particular examples with reference to which they are described, unless expressly specified otherwise. The present disclosure is neither a literal description of all examples nor a listing of features of the invention that must be present in all examples.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. The mere usage of the ordinal numbers "first," "second," "third," and so on does not indicate any physical order or location, any ordering in time, or any ranking in importance, quality, or otherwise. In addition, the mere usage of ordinal numbers does not define a numerical limit to the features identified with the ordinal numbers.

When introducing elements, the articles "a," "an," "the," and "said" are intended to mean that there are one or more of the elements. The terms "comprising," including," and "having" are intended to be inclusive and mean that there may be additional elements other than the listed elements.

When a single device, component, module, or structure is described, multiple devices, components, modules, or structures (whether or not they cooperate) may instead be used in place of the single device, component, module, or structure. Functionality that is described as being possessed by a single device may instead be possessed by multiple devices, whether or not they cooperate. Similarly, where multiple devices, components, modules, or structures are described herein, whether or not they cooperate, a single device, component, module, or structure may instead be used in place of the multiple devices, components, modules, or structures. Functionality that is described as being possessed by multiple devices may instead be possessed by a single device.

The respective techniques and tools described herein may be utilized independently and separately from other techniques and tools described herein.

Device, components, modules, or structures that are in communication with each other need not be in continuous communication with each other, unless expressly specified otherwise. On the contrary, such devices, components, modules, or structures need only send to each other as necessary or desirable, and they may actually refrain from exchanging data most of the time. For example, a device in communication with another device via the Internet might not send data to the other device for weeks at a time. In addition, devices, components, modules, or structures that are in communication with each other may communicate directly or indirectly through one or more intermediaries.

As used herein, the term "send" denotes any way of conveying information from one device, component, module, or structure to another device, component, module, or structure. The term "receive" denotes any way of getting information at one device, component, module, or structure from another device, component, module, or structure. The devices, components, modules, or structures can be part of the same computer system or different computer systems. Information can be passed by value (e.g., as a parameter of a message or function call) or passed by reference (e.g., in a buffer). Depending on context, information can be communicated directly or be conveyed through one or more intermediate devices, components, modules, or structures. As used herein, the term "connected" denotes an operable communication link between devices, components, modules, or structures, which can be part of the same computer system or different computer systems. The operable communication link can be a wired or wireless network connection, which can be direct or pass through one or more intermediaries (e.g., of a network).

As used herein, the term "set," when used as a noun to indicate a group of elements, indicates a non-empty group, unless context clearly indicates otherwise. That is, the "set" has one or more elements, unless context clearly indicates otherwise.

A description of an example with several features does not imply that all or even any of such features are required. On the contrary, a variety of optional features are described to illustrate the wide variety of possible examples of the innovations described herein. Unless otherwise specified explicitly, no feature is essential or required.

Further, although process steps and stages may be described in a sequential order, such processes may be configured to work in different orders. Description of a specific sequence or order does not necessarily indicate a requirement that the steps or stages be performed in that order. Steps or stages may be performed in any practical order. Further, some steps or stages may be performed simultaneously despite being described or implied as occurring non-simultaneously. Description of a process as including multiple steps or stages does not imply that all, or even any, of the steps or stages are essential or required. Various other examples may omit some or all of the described steps or stages. Unless otherwise specified explicitly, no step or stage is essential or required. Similarly, although a product may be described as including multiple aspects, qualities, or characteristics, that does not mean that all of them are essential or required. Various other examples may omit some or all of the aspects, qualities, or characteristics.

An enumerated list of items does not imply that any or all of the items are mutually exclusive, unless expressly specified otherwise. Likewise, an enumerated list of items does not imply that any or all of the items are comprehensive of any category, unless expressly specified otherwise.

For the sake of presentation, the detailed description uses terms like "determine" and "select" to describe computer operations in a computer system. These terms denote operations performed by one or more processors or other components in the computer system, and should not be confused with acts performed by a human being. The actual computer operations corresponding to these terms vary depending on implementation.

In the examples described herein, identical reference numbers in different figures indicate an identical component, module, or operation. More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique or tool does not solve all such problems. It is to be understood that other examples may be utilized and that structural, logical, software, hardware, and electrical changes may be made without departing from the scope of the disclosure.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more non-transitory computer-readable media having stored thereon computer-executable instructions for causing a processor system, when programmed thereby, to perform operations comprising:

at a media server proxy, receiving a request, from a playback tool, according to a first streaming media protocol ("SMP") to provide information about outgoing media segments of a media sequence;

at the media server proxy, generating the information about the outgoing media segments;

sending, from the media server proxy to the playback tool, the information about the outgoing media segments;

at the media server proxy, retrieving, from a remote server, incoming media content for the media sequence according to a second SMP different than the first SMP, wherein the media server proxy appears, to the remote server, to be a local client retrieving the incoming media content according to the second SMP;

at the media server proxy, assembling the outgoing media segments based at least in part on the incoming media content; and streaming, from the media server proxy to the playback tool, the outgoing media segments according to the first SMP, wherein the media server proxy appears, to the playback tool, to be the remote server streaming the outgoing media segments according to the first SMP;

at the media server proxy; updating the information about the outgoing media segments to include new outgoing media segments; and sending, from the media server proxy to the playback tool, the updated information about the outgoing media segments.

2. The one or more non-transitory computer-readable media of claim 1, wherein the outgoing media segments are stored in an outgoing media buffer, and wherein:

the retrieving the incoming media content includes, according to the second SMP, iteratively:
sending a request, to the remote server, to provide a given portion of the incoming media content;
receiving the given portion of the incoming media content from the remote server; and
buffering the given portion of the incoming media content in an incoming media buffer; and the streaming the outgoing media segments includes, according to the first SMP, iteratively:
receiving a request, from the playback tool, to provide a given outgoing media segment among the outgoing media segments;
retrieving the given outgoing media segment from the outgoing media buffer; and
sending the given outgoing media segment to the playback tool.

3. The one or more non-transitory computer-readable media of claim 1, wherein the receiving the request to provide the information about outgoing media segments includes:

intercepting the request to provide the information about outgoing media segments; and based at least in part on the request, identifying the remote server in a list of servers for which the media server proxy acts as an intermediary.

4. The one or more non-transitory computer-readable media of claim 1, wherein the request to provide the information about outgoing media segments is part of a pseudo-URL that identifies the media server proxy.

5. The one or more non-transitory computer-readable media of claim 4, wherein the playback tool is a Web application that is executable in a browser environment, wherein the media server proxy is a service worker, wherein the pseudo-URL is a call to register the service worker, and wherein the outgoing media segments are in scope for the service worker.

6. The one or more non-transitory computer-readable media of claim 1, wherein the information about the outgoing media segments is organized as a playlist, and wherein the information about the outgoing media segments includes, for a given outgoing media segment among the outgoing media segments:

a location of the given outgoing media segment;
a file name of the given outgoing media segment;
a bit rate of the given outgoing media segment;
a resolution of the given outgoing media segment;
a timestamp of the given outgoing media segment; and/or
a duration of the given outgoing media segment.

7. The one or more non-transitory computer-readable media of claim 1, wherein the operations further comprise, at the media server proxy:

sending a request, to the remote server, to provide information about the incoming media content; and receiving the information about the incoming media content, wherein the generating the information about the outgoing media segments uses the information about the incoming media content.

8. The one or more non-transitory computer-readable media of claim 1, wherein the first SMP is selected from the group consisting of HTTP Live Streaming ("HLS"), Dynamic Adaptive Streaming over HTTP ("DASH"), and Microsoft Smooth Streaming ("MSS"), and wherein the second SMP is selected from the group consisting of a low-latency proprietary media streaming protocol, Secure Reliable Transport ("SRT"), and Faster-Than-Light ("FTL").

9. The one or more non-transitory computer-readable media of claim 1, wherein, compared to the second SMP, the first SMP has:

higher expected minimum latency due to longer buffering by the playback tool before playback begins or a longer time window for receipt of network packets;

ineffective rate control in a lossy network between the remote server and the playback tool, due to limitations of client-side rate control, more aggressive congestion control, and/or more aggressive flow control; or features that hinder client-side composition of media sequences.

10. The one or more non-transitory computer-readable media of claim 1, wherein the assembling the outgoing media segments includes:

setting the outgoing media segments from the incoming media content, each portion of the incoming media content providing a corresponding one of the outgoing media segments;

repackaging the incoming media content, wherein a set of m portions among the incoming media content is repackaged as a set of n outgoing media segments among the outgoing media segments, wherein m and n are natural numbers, and m is not equal to n; or transcoding the incoming media content between container formats and/or transcoding between media codec formats.

11. The one or more non-transitory computer-readable media of claim 1, wherein the operations further comprise, at the media server proxy, for a given portion of the incoming media content:

transcoding the given portion from a source container format to a target container format different than the source container format, thereby producing a version of the given portion in the target container format, wherein the version of the given portion in the target container format provides a corresponding outgoing media segment among the outgoing media segments; or transcoding the given portion from a source media codec format to a target media codec format different than the source media codec format, thereby producing a version of the given portion in the target media codec format, wherein the version of the given portion in the target media codec format provides a corresponding outgoing media segment among the outgoing media segments.

12. The one or more non-transitory computer-readable media of claim 1, wherein the operations further comprise, at the media server proxy:

identifying one or more other portions of another media sequence; and composing a given portion, among the incoming media content, and the identified one or more other portions into a given outgoing media segment among the outgoing media segments.

13. The one or more non-transitory computer-readable media of claim 1, wherein the operations further comprise, at the media server proxy:

determining an adjustment to bit rate of the media sequence, wherein the updating the information about the outgoing media segments is based at least in part on the adjustment to the bit rate of the media sequence.

14. The one or more non-transitory computer-readable media of claim 13, wherein the operations further comprise:

receiving, from the remote server, an indication of the adjustment to the bit rate of the media sequence.

15. The one or more non-transitory computer-readable media of claim 1, wherein the media server proxy and the playback tool are hosted on a client device.

16. The one or more non-transitory computer-readable media of claim 1, wherein the media server proxy is hosted on a gateway server, and wherein the playback tool is hosted on a client device connected over a local network to the gateway server.

17. A computer system comprising one or more processing units and memory, wherein the computer system implements a media server proxy comprising:

a request handler configured to perform request handling operations comprising:

receiving a request, from a playback tool, according to a first streaming media protocol ("SMP") to provide information about outgoing media segments of a media sequence, wherein the first SMP is selected from the group consisting of HTTP Live Streaming ("HLS"), Dynamic Adaptive Streaming over HTTP ("DASH"), and Microsoft Smooth Streaming "MSS");

sending, to the playback tool, the information about the outgoing media segments; and streaming, to the playback tool, the outgoing media segments according to the first SMP;

a playlist generator configured to generate the information about the outgoing media segments;

a server communication module configured to perform retrieval operations comprising retrieving, from a remote server, incoming media content for the media sequence according to a second SMP different than the first SMP, wherein the second SMP is selected from the group consisting of a low-latency proprietary media streaming protocol, Secure Reliable Transport "SRT"), and Faster-Than-Light ("FTL"); and a segment assembler configured to perform assembly operations comprising assembling the outgoing media segments based at least in part on the incoming media content.

18. The computer system of claim 17, wherein the request to provide the information about outgoing media segments is part of a pseudo-URL that identifies the media server proxy.

19. The computer system of claim 18, wherein the playback tool is a Web application that is executable in a browser environment, wherein the media server proxy is a service worker, wherein the pseudo-URL is a call to register the service worker, and wherein the outgoing media segments are in scope for the service worker.

20. A method comprising:

receiving, at a computer system, software for a media server proxy; and with the software, configuring the computer system to perform operations as the media server proxy, the operations comprising:

receiving a request, from a playback tool, according to a first streaming media protocol ("SMP") to provide information about outgoing media segments of a media sequence;

generating the information about the outgoing media segments;

sending, to the playback tool, the information about the outgoing media segments;

retrieving, from a remote server, incoming media content for the media sequence according to a second SMP different than the first SMP;

assembling the outgoing media segments based at least in part on the incoming media content; and streaming, to the playback tool, the outgoing media segments according to the first SMP;

receiving, from the remote server, an indication of an adjustment to bit rate of the media sequence;

determining the adjustment to the bit rate of the media sequence;

based at least in part on the adjustment to the bit rate of the media sequence, updating the information about the outgoing media segments to include new outgoing media segments; and sending, to the playback tool, the updated information about the outgoing media segments.

* * * * *